United States Patent [19]

Passalenti et al.

[11] 4,169,113
[45] Sep. 25, 1979

[54] UNSATURATED POLYESTER RESIN COMPOSITIONS HAVING IMPROVED STABILITY

[75] Inventors: Beppino Passalenti, Lissone; Giorgio Brumat, Verano Brianza; Silvio Vargiu, Casatenovo, all of Italy

[73] Assignee: Societa' Italiana Resine S.I.R. S.p.A., Milan, Italy

[21] Appl. No.: 822,173

[22] Filed: Aug. 5, 1977

[30] Foreign Application Priority Data

Aug. 5, 1976 [IT] Italy ................................ 26048 A/76

[51] Int. Cl.$^2$ ...................... C08K 3/16; C08K 5/10; C08K 5/19; C08K 5/08
[52] U.S. Cl. .................................... 525/4; 525/6; 525/1
[58] Field of Search ................ 260/863, 869, 864, 866

[56] References Cited

U.S. PATENT DOCUMENTS

| | | | |
|---|---|---|---|
| 2,712,536 | 7/1955 | Winslow | 260/884 |
| 2,773,049 | 12/1956 | Cowee | 260/863 |
| 3,061,580 | 10/1962 | Erickson et al. | 260/863 |
| 3,188,363 | 6/1965 | Amidon et al. | 260/863 |
| 3,649,711 | 3/1972 | Payne | 260/863 |
| 3,723,349 | 3/1973 | Heseltine et al. | 260/863 |
| 3,819,496 | 6/1974 | Roskott et al. | 260/863 |
| 3,823,202 | 7/1974 | Buzbee et al. | 260/861 |
| 4,013,815 | 3/1977 | Dorfman et al. | 260/863 |

Primary Examiner—Veronica P. Hoke
Attorney, Agent, or Firm—Sughrue, Rothwell, Mion, Zinn and Macpeak

[57] ABSTRACT

The stability under storage of unsaturated polyester resin compositions is improved by adding from 20 to 300 ppm, with respect to the unsaturated polyester resin, of one or more stabilizers chosen from halides of alkaline earth metals and halides of metals of Group VIII of the Periodic Table of the Elements.

10 Claims, No Drawings

UNSATURATED POLYESTER RESIN COMPOSITIONS HAVING IMPROVED STABILITY

The present invention relates to unsaturated polyester resin compositions having improved stability.

In the following description, by unsaturated polyester resins, or polyester resins, are meant solutions in an acrylic or vinylic liquid monomer of the product obtained by the polycondensation of a mixture comprising polycarboxylic acids and polyhydric alcohols in which one or the other class of the above compounds is unsaturated.

It is known that unsaturated polyester resins have a time-limited stability and that this stability is reduced as the temperature at which the said resins are stored is raised.

Therefore storage conditions must be accurately monitored in order to avoid changes in, or even total loss of the resin due to gelling.

The use of inhibiting substances in order to avoid premature polymerisation of the polyester resins is known in the art. The said inhibiting substances usually are chosen from among the salts of amines, quaternary ammonium salts, and the dihydric phenols such as hydroquinone, catechol or their alkyl derivatives.

The use of these inhibitors results in a time-stability of the polyester resin of up to about six months at temperatures of the order of 20° C.

However, this stability diminishes rapidly with increase in temperature, such that at values close to 50° C. the stability times are so low as to prevent, in practice, the utilisation of the polyester resin.

Since the need for transport and storage under severe environmental conditions often arises, it is felt necessary to have available unsaturated polyester resins possessing high stability at elevated temperatures, in particular at temperatures greater than 30° C.

Such stability is achieved according to the present invention which provides an unsaturated polyester resin composition containing from 20 to 300 ppm, with respect to the unsaturated polyester resin, of one or more stabilizers chosen from the halides of the alkaline earth metals and the halides of the metals of group VIII of the periodic table of the elements.

Particularly useful for the purpose are the chlorides and bromides of iron, cobalt and calcium.

Besides the halide stabilizers the composition of the present invention may contain conventional stabilizers, such as trimethylbenzyl ammonium chloride, p-quinone, hydroquinone and p-tert-butyl catechol, usually in amounts of the order of 100–200 ppm with respect to the unsaturated polyester resin.

The unsaturated polyester resins which are stabilized according to the present invention are those, known in the art, consisting of solutions in an unsaturated, acrylic or vinylic liquid monomer of the product of the polycondensation of a mixture comprising polycarboxylic acids and polyhydric alcohols, in which one or the other class of the above compounds is unsaturated.

Normally arylvinyl compounds and particularly styrene are used as unsaturated monomers.

The polycondensation product is generally obtained from saturated dihydric alcohols (such as the ethylene, propylene, diethylene and dipropylene glycols) and from unsaturated bicarboxylic acids (such as maleic, fumaric, itaconic and citraconic acids) or their anhydrides (such as maleic anhydride).

Also stabilized according to the present invention are those modified polyester resins which are made by adding, during polycondensation, small amounts of saturated and/or unsaturated compounds chosen from monocarboxylic acids, monohydric alcohols, alcohol with more than two hydroxyl groups per molecule and acids with more than two carboxyl groups per molecule.

Finally the unsaturated bicarboxylic acids may be partially replaced by equivalent amounts of saturated carboxylic acids or their anhydrides such as succinic, adipic, azelaic and phthalic acids and phthalic anhydride.

The unsaturated polyester resin composition may contain conventional additives such as fillers and pigments.

The acrylic or vinylic monomer is generally present in an amount of from 30 to 100 parts by weight for every 100 parts by weight of polycondensation product.

The said polycondensation product has preferably an acid value of from 15 to 40 and a Gardner viscosity of X-Z, as measured at 25° C. in a 70 wt.% solution in styrene.

The best results are obtained when the halide stabilizer is present in an amount of from 100 to 200 ppm with respect to the unsaturated polyester resin.

EXAMPLE 1

Into a flask furnished with a condensor, an agitator, a thermometer and a device for introducing inert gas, are loaded phthalic anhydride, maleic anhydride and propylene glycol in a molar ratio equal to 1:1:2.1.

Polycondensation is carried out at about 205° C. up to an acid value of the order of 35–40 and a Gardner viscosity of Q-R, as measured at 25° C. in a 60% solution in butyl Cellosolve.

The mass is then cooled to 100° C., and styrene containing p-quinone, hydroquinone and p-tert-butyl catechol is added. The quantity of styrene added is such as to ensure a concentration of the same of 30% by weight in the resulting unsaturated polyester resin.

Five samples of the polyester resin are submitted to stability tests upon addition of halide stabilizers to four samples. The composition of the samples and the results of the stability tests are shown in Table 1.

In the said Table, sample 5 is a check sample.

Table 1.

| Sample | 1 | 2 | 3 | 4 | 5 |
|---|---|---|---|---|---|
| Polyester resin (parts by weight) | 100 | 100 | 100 | 100 | 100 |
| $FeCl_3$ (ppm) | 200 | 100 | — | — | — |
| $CaCl_2$ (ppm) | — | — | 200 | — | — |
| $CoCl_2$ (ppm) | — | — | — | 200 | — |
| p-quinone (ppm) | 50 | 50 | 50 | 50 | 50 |
| hydroquinone (ppm) | 25 | 25 | 25 | 25 | 25 |
| p-tert-butyl catechol (ppm) | 25 | 25 | 25 | 25 | 25 |
| Stability at 100° C. in hours | 39 | 17 | 13 | 8 | 5 |
| Stability at 52° C. in days | 25 | 14 | 9 | 6 | 3 |

EXAMPLE 2

Operating according to the procedure used in Example 1, phthalic anhydride, maleic anhydride and propylene glycol are submitted to polycondensation in a molar ratio equal to 0.8:1.2:2.1.

The polycondensation product is then dissolved in styrene as in Example 1.

For the polyester resins in Example 1 (Resin A) and Example 2 (Resin B) containing 150 ppm of ferric chloride, a determination of the variations in gel time during storage is carried out in comparison with the same resins without ferric chloride. More particularly, in these tests, 2 Kg of the composition of the polyester resin are kept in a thermostatically controlled environment at 38°±2° C. and at predetermined time intervals samples are taken in order to determine the gel time.

The results of these determinations are recorded in Table 2.

Table 2

| | | | | |
|---|---|---|---|---|
| Resin A (Parts by weight) | — | — | 100 | 100 |
| Resin B (Parts by weight) | 100 | 100 | — | — |
| FeCl$_3$ (ppm) | — | 150 | — | 150 |
| Gel time at 25° C. (in minutes) | | | | |
| Initial | 68 | 62 | 66 | 71 |
| after 1 month | 90 | 70 | 80 | 73 |
| after 2 months | 130 | 76 | 90 | 78 |
| after 3 months | 150 | 74 | 96 | 80 |
| after 4 months | 170 | 73 | 104 | 76 |
| after 6 months | 210 | 65 | 110 | 73 |

In the aforesaid tests:

The acid value indicates the number of milligrams of potassium hydroxide necessary to neutralize one gram of unsaturated polyester resin.

The gel time is determined in the following manner. 100 grams of unsaturated polyester resin are weighed in a small beaker, 0.2 ml of a cobalt octoate solution containing 6% by weight of metallic cobalt are added, the mass is homogenized and the small beaker is immersed in a bath thermostatically maintained at 25° C., the level of the composition being maintained 1 cm below the level of the liquid in the bath.

1.5 ml of methyl ethyl ketone peroxide (strength 50% by weight) are then added, the mass is homogenized, and the chronometer is started.

A test is carried out every 4–5 minutes by effecting a complete turn with a rod in the composition, and then quickly removing the rod. Gelling has occurred when, upon raising the rod, the resin is not drawn out but immediately detaches itself from the rod.

We claim:

1. An unsaturated polyester resin composition stable under storage, which consists essentially of (1) an unsaturated polyester resin in solution in an unsaturated acrylic or vinylic liquid monomer, (2) from 20 to 300 ppm, with respect to the unsaturated polyester resin, of one or more stabilizers selected from the group consisting of the halides of calcium and the halides or iron and (3) from 100 to 200 ppm, with respect to the unsaturated polyester resin, of one or more further stabilizers chosen from trimethylbenzylammonium chloride, p-quinone, hydroquinone and p-tert-butyl catechol.

2. The unsaturated polyester resin composition of claim 1, in which said stabilizers (2) are present in an amount of from 100 to 200 ppm with respect to the unsaturated polyester resin.

3. The unsaturated polyester resin composition of claim 1, wherein said unsaturated polyester resin is the polycondensation product of a mixture comprising polycarboxylic acids and polyhydric alcohols in which either the polycarboxylic acids or the polyhydric alcohols are unsaturated.

4. The unsaturated polyester resin composition of claim 1, wherein said stabilizer is FeCl$_3$.

5. The unsaturated polyester resin composition of claim 1, wherein said acrylic or vinylic monomer is present in an amount of from 30 to 100 parts by weight for every 100 parts by weight of said unsaturated polyester resin.

6. The unsaturated polyester resin composition of claim 1, wherein said unsaturated polyester resin has an acid value of from 15 to 40 and a Gardner viscosity of X-Z, measured at 25° C. in a 70 weight percent solution in styrene.

7. The unsaturated polyester resin composition of claim 1, wherein said stabilizer (1) is CaCl$_2$.

8. The unsaturated polyester composition of claim 1, wherein said further stabilizers are chosen from p-quinone, hydroquinone and p-tert-butyl catechol.

9. An unsaturated polyester resin composition stable under storage, which consists essentially of from 20 to 300 ppm, with respect to said resin and the unsaturated resin, of one or more stabilizers selected from the group consisting of chlorides and bromides of calcium.

10. An unsaturated polyester resin composition stable under storage, which consists essentially of from 20 to 300 ppm, with respect to said resin and the unsaturated resin of one or more stabilizers selected from the group consisting of chlorides and bromides of iron.

* * * * *